United States Patent
Kim et al.

(10) Patent No.: US 9,338,782 B2
(45) Date of Patent: May 10, 2016

(54) METHOD AND APPARATUS FOR RECEIVING DATA USING EXTENSION CARRIER IN WIRELESS ACCESS SYSTEM

(71) Applicant: LG Electronics Inc., Seoul (KR)

(72) Inventors: Jinmin Kim, Anyang-si (KR); Seunghee Han, Anyang-si (KR); Hyukmin Son, Anyang-si (KR); Hyunwoo Lee, Anyang-si (KR); Hyeyoung Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 14/355,928

(22) PCT Filed: Nov. 2, 2012

(86) PCT No.: PCT/KR2012/009165
§ 371 (c)(1),
(2) Date: May 2, 2014

(87) PCT Pub. No.: WO2013/066098
PCT Pub. Date: May 10, 2013

(65) Prior Publication Data
US 2014/0321408 A1    Oct. 30, 2014

Related U.S. Application Data

(60) Provisional application No. 61/554,503, filed on Nov. 2, 2011.

(51) Int. Cl.
*H04W 4/00*   (2009.01)
*H04W 72/04*  (2009.01)
*H04L 5/00*   (2006.01)
*H04W 72/00*  (2009.01)
*H04W 72/12*  (2009.01)

(52) U.S. Cl.
CPC ........... *H04W 72/0453* (2013.01); *H04L 5/001* (2013.01); *H04L 5/0053* (2013.01); *H04L 5/0073* (2013.01); *H04W 72/00* (2013.01); *H04W 72/1289* (2013.01)

(58) Field of Classification Search
None
See application file for complete search history.

(56) References Cited

U.S. PATENT DOCUMENTS

| 2013/0003673 A1* | 1/2013 | Dinan | H04W 72/0406 370/329 |
| 2013/0176952 A1* | 7/2013 | Shin | H04L 5/001 370/329 |

FOREIGN PATENT DOCUMENTS

| KR | 1020100039203 | 4/2010 |
| KR | 1020100118535 | 11/2010 |

OTHER PUBLICATIONS

Intel Corporation, "On New Carrier Types: Extension Carriers and Carrier Segments." 3GPP TSG RAN WG1 Meeting #66, R1-112215, Aug. 22-26, 2011.
Ericsson St-Ericsson, "Discussion on Design Principles for Additional Carrier Types." 3GPP TSG RAN WG1 Meeting #66, R1-112082, Aug. 22-26, 2011.

* cited by examiner

*Primary Examiner* — Edan Orgad
*Assistant Examiner* — Rebecca Song
(74) *Attorney, Agent, or Firm* — Dentons US LLP

(57) ABSTRACT

Disclosed are a method and an apparatus for receiving data using an extension carrier in a wireless access system that supports a carrier aggregation/multiple cells. A method in which a terminal receives data in a wireless access system that supports a carrier aggregation according to one embodiment of the present invention comprises: a step of receiving data starting point information indicating the symbol in a subframe at which a transmission of said data starts when data is transmitted via a secondary carrier that constitutes the carrier aggregation together with a primary carrier; and a step of receiving said data via the secondary carrier based on the data starting point information. The symbol at which the transmission of said data starts is determined from any one of a plurality of symbols including a first symbol of the subframe.

9 Claims, 9 Drawing Sheets

FIG. 6
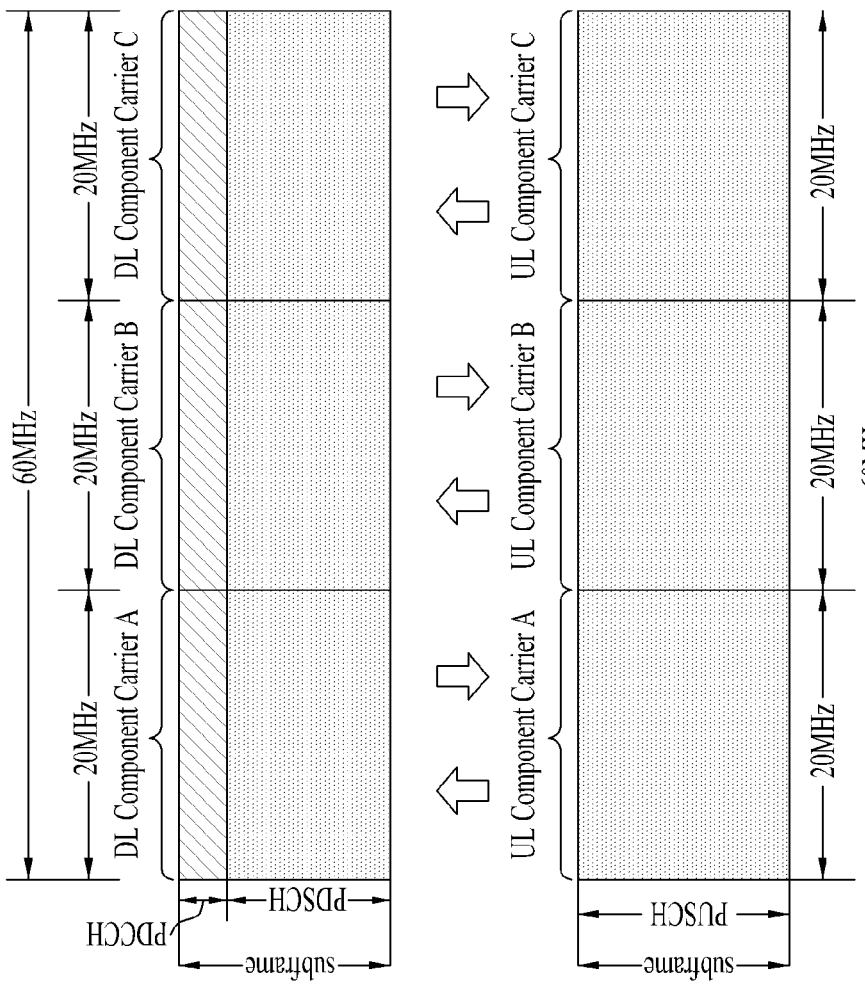
(b) Multiple CC
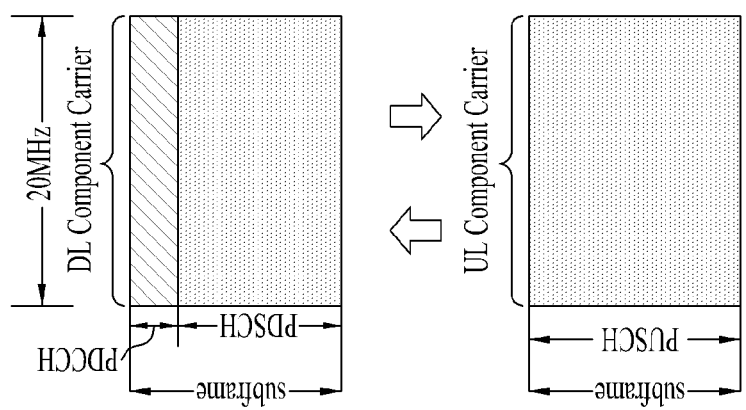
(a) Single CC

US 9,338,782 B2

METHOD AND APPARATUS FOR RECEIVING DATA USING EXTENSION CARRIER IN WIRELESS ACCESS SYSTEM

This application is a 35 USC §371 National Stage entry International application No. PCT/KR2010/009165 filed on Nov. 2, 2012, and claims priority to US Provisional Application No. 61/554,503 filed on Nov. 2, 2011, all of which are hereby incorporated by reference in their entireties as if fully set forth herein.

TECHNICAL FIELD

The present invention relates to a wireless access system, and more particularly, to a method of receiving data using an extension carrier in a wireless access system supportive of carrier aggregation/multiple cells and apparatus for supporting the same.

BACKGROUND ART

One of important requisites for a next generation wireless access system is to support a high data rate requirement. To this end, many ongoing efforts are made to research and develop various technologies including MIMO (multiple input multiple output), CoMP (cooperative multiple point transmission), Relay and the like.

In a wireless access system of a related art, a single carrier is mainly considered despite setting bandwidths of uplink and downlink to differ from each other. For instance, a wireless communication is provided based on a single carrier as follows. First of all, the number of carrier(s) configuring each of the uplink and the downlink is 1. Secondly, a bandwidth of the uplink and a bandwidth of the downlink are symmetric to each other in general.

Therefore, in order meet a higher data rate requirement, Carrier Aggregation (CA)/Multiple Cells are introduced as the concept of bundling a multitude of bands into a single system. Each of the distributed bands in the carrier aggregation is designed to meet the basic requirements for enabling a system independently.

In this case, a carrier of a bandwidth unit capable of each independent operation can be named a component carrier (CC). In order to support an increasing transmission capacity, the recent 3GPP LTE-A or 802.16m continues to extend its bandwidth up to 20 MHz or higher. In doing so, at least one or more component carriers are aggregated to support a broadband. For instance, if a single component carrier supports a bandwidth of 5 MHz, 10 MHz or 20 MHz, it is able to support a system bandwidth up to maximum 100 MHz in a manner of bundling maximum 5 components together.

DISCLOSURE OF THE INVENTION

Technical Tasks

One object of the present invention is to provide a method of receiving data using an extension carrier in a wireless access system, and preferably, in a carrier aggregation supportive wireless access system and apparatus therefor.

Another object of the present invention is to provide a method of receiving data and apparatus therefor, by which the data can be transmitted using a $1^{st}$ symbol of a subframe when the data is transmitted on a secondary carrier configuring carrier aggregation together with a primary carrier.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving data, which is received by a user equipment in a wireless access system supportive of carrier aggregation, according to one embodiment of the present invention may include the steps of receiving a data starting point information indicating a symbol for starting a transmission of the data in a subframe when the data is transmitted on a secondary carrier configuring the carrier aggregation with a primary carrier and receiving the data on the secondary carrier based on the data starting point information, wherein the symbol for starting the transmission of the data is determined as one of a plurality of symbols including a $1^{st}$ symbol of the subframe.

To further achieve these and other advantages and in accordance with the purpose of the present invention, as embodied and broadly described, a method of transmitting data, which is transmitted by a base station in a wireless access system supportive of carrier aggregation, according to another embodiment of the present invention may include the steps of transmitting a data starting point information indicating a symbol for starting a transmission of the data in a subframe when the data is transmitted on a secondary carrier configuring the carrier aggregation with a primary carrier and transmitting the data on the secondary carrier based on the data starting point information, wherein the symbol for starting the transmission of the data is determined as one of a plurality of symbols including a $1^{st}$ symbol of the subframe.

To further achieve these and other advantages and in accordance with the purpose of the present invention, as embodied and broadly described, a user equipment, which receives data, which receives data in a wireless access system supportive of carrier aggregation, according to further embodiment of the present invention may include an RF (radio frequency) unit configured to transceive radio signals and a processor receiving a data starting point information indicating a symbol for starting a transmission of the data in a subframe when the data is transmitted on a secondary carrier configuring the carrier aggregation with a primary carrier, the processor receiving the data on the secondary carrier based on the data starting point information, wherein the symbol for starting the transmission of the data is determined as one of a plurality of symbols including a $1^{st}$ symbol of the subframe.

To further achieve these and other advantages and in accordance with the purpose of the present invention, as embodied and broadly described, a base station, which transmits data in a wireless access system supportive of carrier aggregation, according to another further embodiment of the present invention may include an RF (radio frequency) unit configured to transceive radio signals and a processor transmitting a data starting point information indicating a symbol for starting a transmission of the data in a subframe when the data is transmitted on a secondary carrier configuring the carrier aggregation with a primary carrier, the processor transmitting the data on the secondary carrier based on the data starting point information, wherein the symbol for starting the transmission of the data is determined as one of a plurality of symbols including a $1^{st}$ symbol of the subframe.

The following matters may be applicable in common to the above-mentioned embodiments of the present invention.

The secondary carrier may carry the data together with a stand-alone carrier and includes an extension carrier to which a resource is allocated by the stand-alone carrier.

The extension carrier may not include a control region for carrying a control signal.

The extension carrier may include an ABS (almost blank subframe) in which the data is not transmitted.

The data starting point may be determined as one selected from the group consisting of $1^{st}$ to $5^{th}$ symbols of the subframe.

If a downlink bandwidth of the extension carrier is equal to or smaller than 10 resource blocks, the data starting point may be determined as one selected from the group consisting of the $1^{st}$, the $3^{rd}$, the $4^{th}$ and the $5^{th}$ symbols of the subframe. If the downlink bandwidth of the extension carrier is greater the 10 resource blocks, the data starting point may be determined as one selected from the group consisting of the $1^{st}$ to $4^{th}$ symbols of the subframe.

If a downlink bandwidth of an adjacent cell having a same center frequency of the extension carrier is equal to or smaller than 10 resource blocks, the data starting point may be determined as one selected from the group consisting of the $1^{st}$, the $3^{rd}$, the $4^{th}$ and the $5^{th}$ symbols of the subframe. If the downlink bandwidth of the adjacent cell having the same center frequency of the extension carrier is greater the 10 resource blocks, the data starting point may be determined as one selected from the group consisting of the $1^{st}$ to $4^{th}$ symbols of the subframe.

The above-mentioned general description of the present invention and the following details of the present invention are exemplary and may be provided for the additional description of the invention disclosed in claims.

Advantageous Effects

According to an embodiment of the present invention, data can be smoothly received using an extension carrier in a wireless access system, and preferably, in a carrier aggregation supportive wireless access system.

According to an embodiment of the present invention, data throughput can be increased in a manner of transmitting data on a $1^{st}$ symbol of a subframe when the data is transmitted on a secondary carrier.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram for one example of component carriers of LTE system and carrier aggregation used by LTE-A system.

BEST MODE FOR INVENTION

Figure 1:
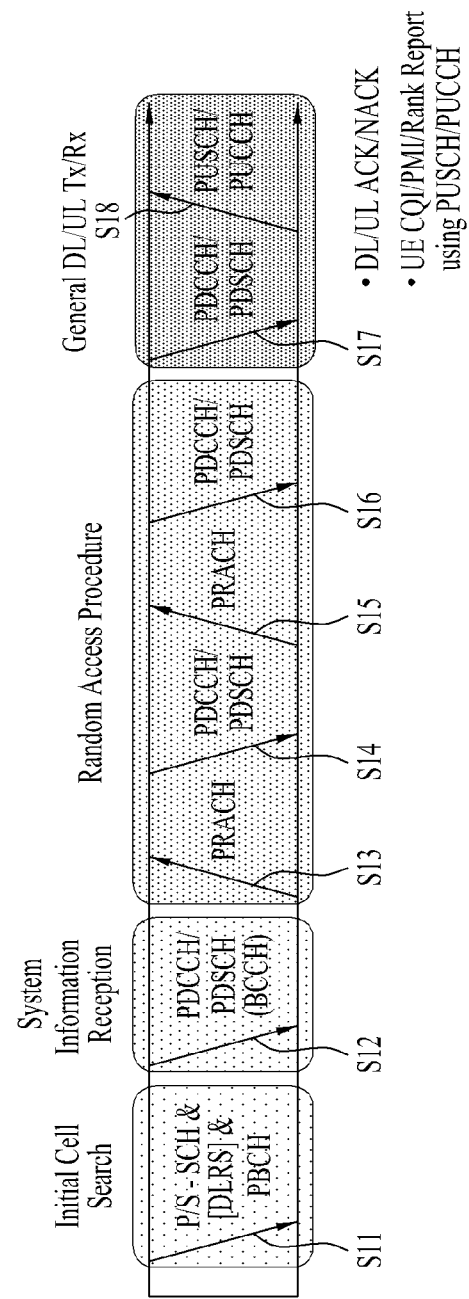
FIG. 1 is a diagram for explaining physical channels used for 3GPP system and a general signal transmitting method using the same.

Reference will now be made in detail to the preferred embodiments of the present invention, examples of which are illustrated in the accompanying drawings. The following detailed description with reference to the accompanying drawings intends to describe exemplary embodiments of the present invention rather than to represent a unique embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-a System to which the Present Invention is Applicable 1. 1. The General of System FIG. 1 is a diagram for explaining physical channels used for 3GPP system and a general signal transmitting method using the same.

First of all, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PD-CCH) and a physical downlink shared control channel (PD-SCH) according to the physical downlink control channel (PDCCH) and may be then able to obtain detailed system information [S12].

Thereafter, the user equipment may perform a random access procedure to complete the access to the base station [S13 to S16]. To this end, the user equipment may transmit a specific sequence as a preamble via a physical random access channel (PRACH) [S13] and may then receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be aperiodically transmitted in response to a request/indication made by a network.

Figure 2:
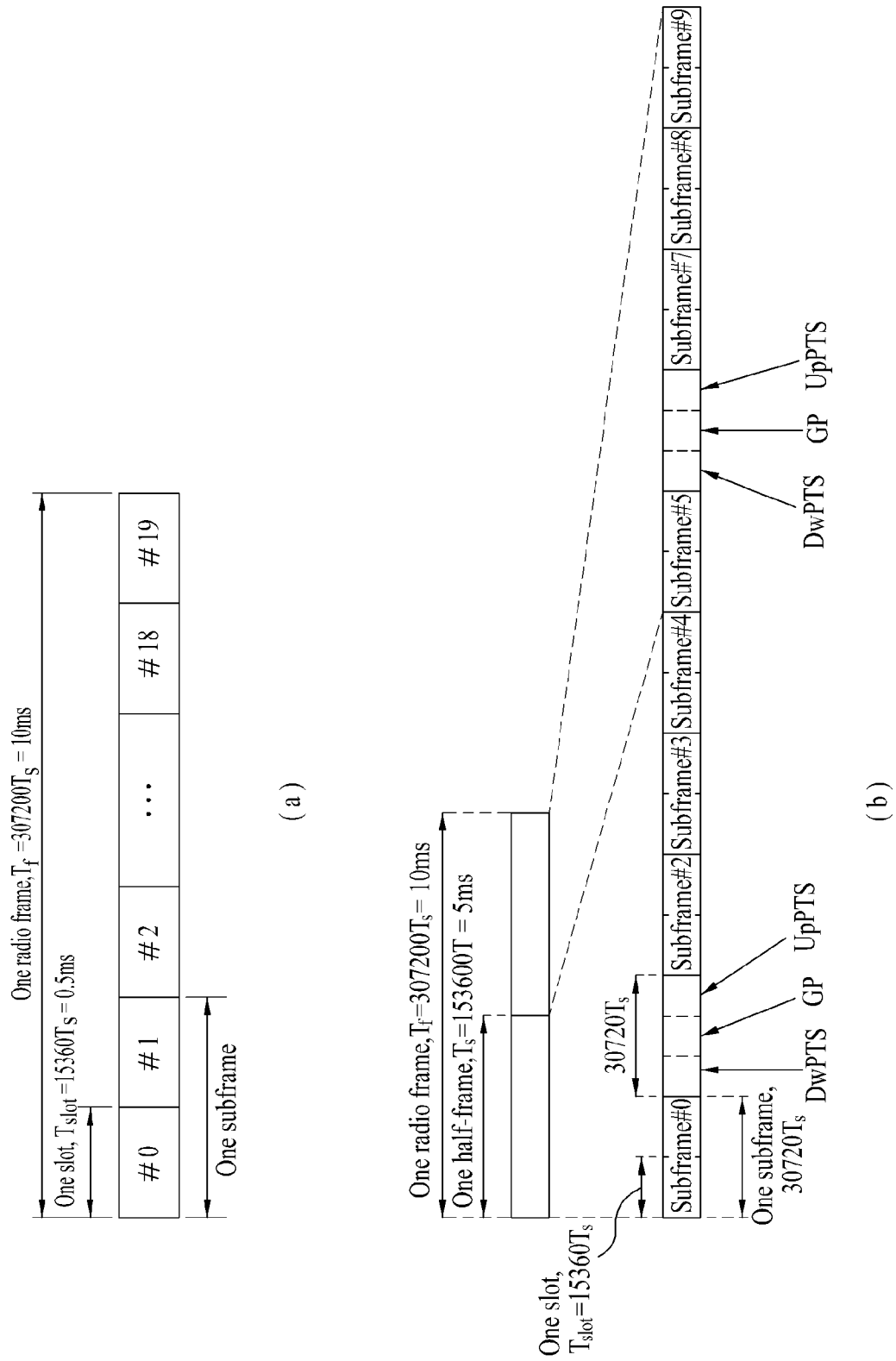
FIG. 2 is a diagram for a structure of a radio frame in 3GPP LTE.

FIG. 2 shows structures of radio frames in 3GPP LTE.

FIG. 2 (*a*) shows a frame structure type 1. This frame structure type 1 may be applicable to both a full duplex FDD (frequency division duplex) system and a half duplex FDD system.

One radio frame has a length of '$T_f=307200 \cdot T_s=10$ ms' and is constructed with 20 slots to which indexes 0 to 19 are respectively given with an equal length of '$T_{slot}=15360 \cdot T_s=0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as '$T_s=1/(15 \text{ kHz} \times 2048)=3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

The above-described structure of the radio frame is one example only. And, the number of subframes included in a radio frame, the number of slots included in the subframe and the number of symbols included in the slot can be modified in various ways.

FIG. 2 (b) shows a frame structure type 2. The frame structure type 2 is applicable to the TDD system. One radio frame has a length of '$T_f=307200·T_s=10$ ms' and is constructed with 2 half-frames each of which has a length of '$15360·T_s=0.5$ ms'. Each of the half-frames is constructed with 5 subframes each of which has a length of '$30720·T_s=1$ ms'. For example, an $i^{th}$ subframe is constructed with a slot corresponding to '$2i$' and a slot corresponding to '$2i+1$', each of which has a length of '$T_{slot}=15360·T_s=0.5$ ms'. In this case, Ts indicates a sampling time and may be represented as 'Ts=1/(15 kHz×2048)=$3.2552\times10^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

Figure 3:
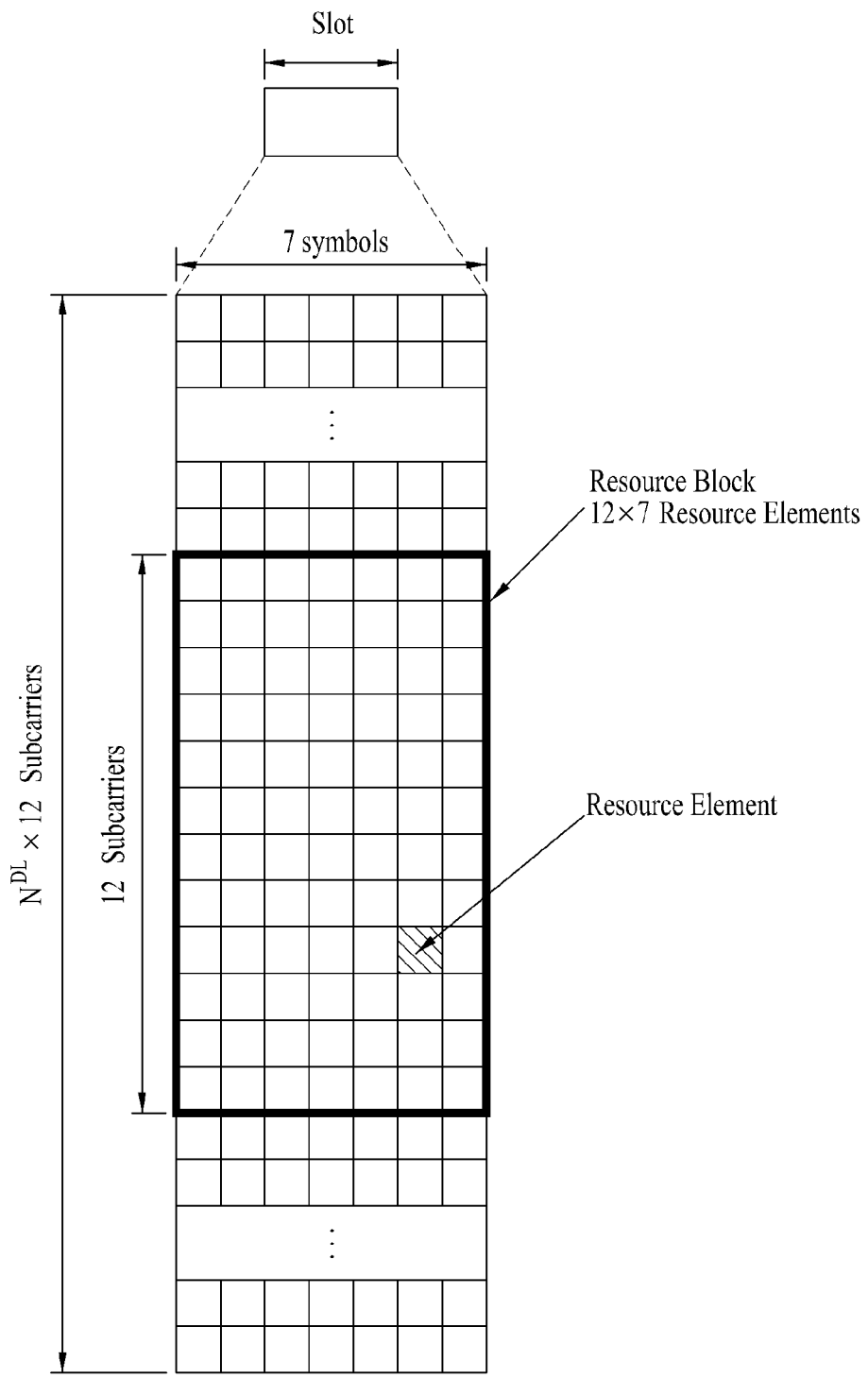
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12 Error! Objects cannot be created from editing field codes. 7 resource elements. The number $N^{DL}$ of resource blocks included in a DL slot may depend on a DL transmission bandwidth. And, the structure of an uplink (UL) slot may be identical to that of the DL slot.

Figure 4:
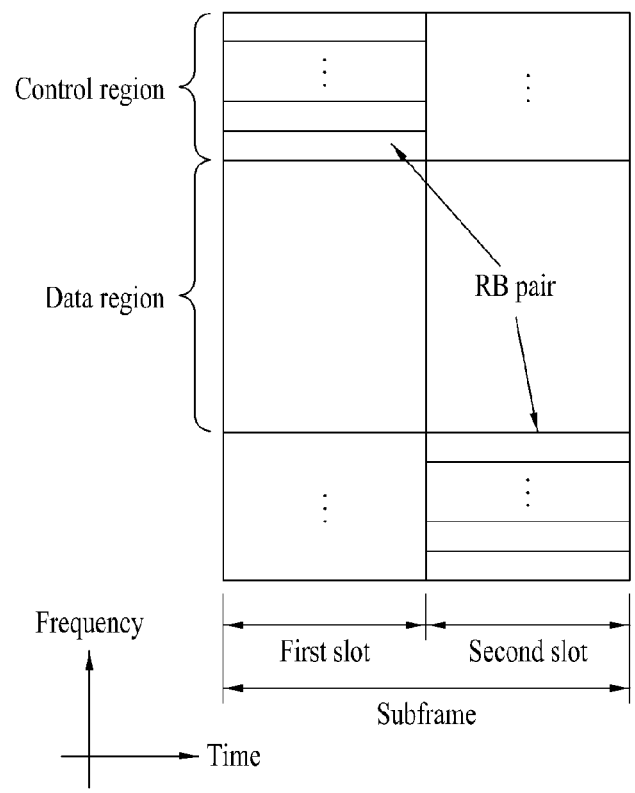
FIG. 4 is a diagram for a structure of an uplink subframe.

FIG. 4 is a diagram for a structure of an uplink (UL) subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
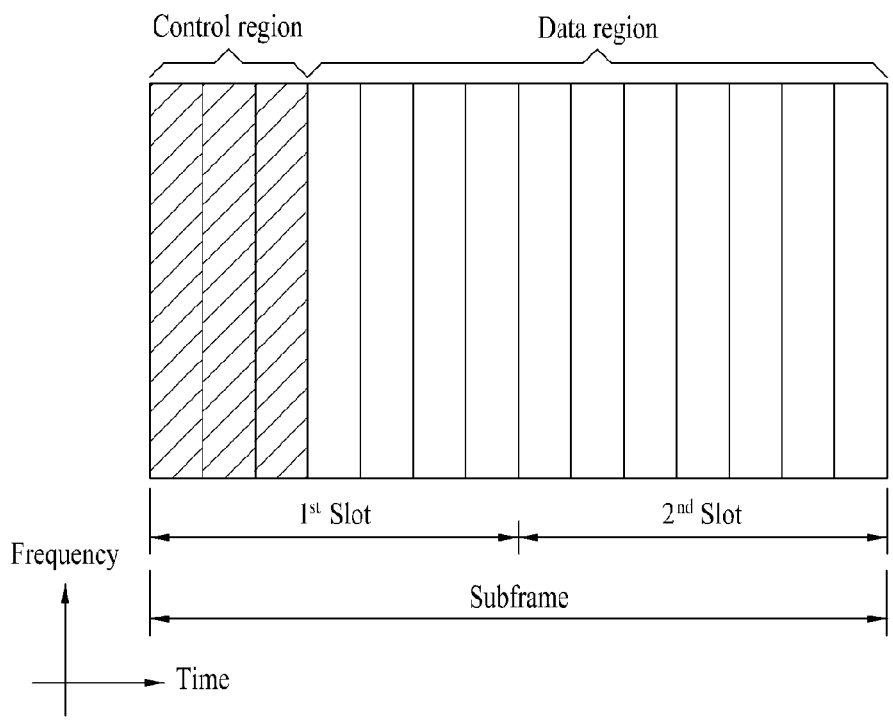
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

1.2. Uplink/Downlink Scheduling in TDD System
1.2.1. Uplink-Downlink Configuration in TDD System In the frame structure type 2, UL-DL (uplink-downlink) configuration indicates that all subframes are assigned to (or reserved for) UL and DL by a prescribed rule. Table 2 shows UL-DL configuration.

TABLE 2

| Uplink-downlink configuration | Downlink-to-Uplink Switch-point periodicity | \multicolumn{10}{c}{Subframe number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in each subframe of a radio frame, 'D' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are the intervals provided for the DL transmission only. UpPTS and a subframe directly contiguous with a special subframe are the intervals for the UL transmission.

The above-mentioned UL-DL configuration may be known to both a base station and a user equipment. The base station is able to inform the user equipment of the change of the UL-DL assigned state of a radio frame in a manner of transmitting an index of configuration information each time UL-DL configuration information is changed. The configuration information is a sort of DL control information and can be transmitted on PDCCH (physical downlink control channel), which is a DL control channel, like other scheduling information. Moreover, the configuration information is a broadcast information and can be commonly transmitted to all user equipments in a cell on a broadcast channel. In the TDD system, the number of half-frames included in a radio frame, the number of subframes included in the half-frame and the combination of DL and UL subframes are just exemplary.

1.2.2. Uplink/Downlink Transmission Timing in TDD System

In case of the frame structure type 1, if a user equipment receives PHICH containing HARQ-ACK/NACK from a base station in an $i^{th}$ DL subframe, the corresponding PHIC is related to PUSCH transmitted by the user equipment in an $(i-4)^{th}$ UL subframe.

In particular, if s specific user equipment receives a UL grant in an $n^{th}$ DL subframe, the user equipment transmits PUSCH in a corresponding $(n+4)^{th}$ UL subframe. If the PUSCH is transmitted in the $(n+4)^{th}$ UL subframe, PHICH, which is an ACK/NACK response to the corresponding PUSCH, is transmitted from a base station in a corresponding $(n+8)^{th}$ DL subframe. In particular, having transmitted the PUSCH in the $(n+4)^{th}$ UL subframe, the user equipment should search/detect/demodulate the PHICH by estimating that the PHICH response to the PUSCH transmitted by the user equipment will be transmitted from the base station in the $(n+8)^{th}$ DL subframe.

On the other hand, in case of the frame structure type 2, since a DL/UL subframe configuration differs per UL-DL configuration, a PUSCH transmission time and a PHICH transmission time are set different depending on a configuration. And, the PUSCH and PHICH transmission times can be configured different from each other in accordance with an index (or numeral) of a subframe.

In LTE system, UL/DL timing relations among PUSCH, PDCCH ahead of the PUSCH and PHICH for carrying DL HARQ ACK/NACK corresponding to the PUSCH are determined in advance.

Table 3 shows a transmission timing relation between PUSCH and PHICH corresponding to the PUSCH per UL-DL configuration.

TABLE 3

| TDD UL/DL Configuration | \multicolumn{10}{c}{subframe number i} | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In case of UL-DL configurations 1 to 6, if a user equipment receives PHICH containing HARQ-ACK/NACK from a base station in an $i^{th}$ DL subframe, the corresponding PHICH is related to PUSCH transmitted by the user equipment in an $(i-k)^{th}$ UL subframe. In this case, a value of k is shown in Table 3.

In case of a UL-DL configuration 0, HARQ-ACK received on PHICH in a resource corresponding to '$I_{PHICH}$=0' allocated to a user equipment in an $i^{th}$ subframe is related to PUSCH transmitted by the user equipment in an $(i-k)^{th}$ subframe. On the other hand, HARQ-ACK received on PHICH in a resource corresponding to '$I_{PHICH}$=1' allocated to a user equipment in an $i^{th}$ subframe is related to PUSCH transmitted by the user equipment in an $(i-6)^{th}$ subframe.

Table 4 shows a transmission timing relation between PUSCH and PHICH corresponding to the PUSCH per UL-DL configuration.

TABLE 4

| TDD UL/DL Configuration | \multicolumn{10}{c}{subframe index n} | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

If a PUSCH transmission from a serving cell is scheduled for a user equipment in an $n^{th}$ UL subframe, PHICH (or ACK/NACK response) for the corresponding UL transmission is transmitted from a base station in an $(i+k_{PHICH})^{th}$ DL subframe. The user equipment should sear5ch/detect/demodulate the corresponding PHICH by estimating that a PHICH response to the PUSCH transmitted by the user equipment in the $(i+k_{PHICH})^{th}$ DL subframe will be transmitted from the base station. In case of FDD system, $k_{PHICH}$ always has a value of 4. Yet, in case of TDD system, a value of $k_{PHICH}$ is shown in Table 4. In case of a subframe bundling operation, a corresponding PHICH resource is related to a last subframe in a bundle.

In the following description, a procedure for a PUSCH transmission in a user equipment is explained.

First of all, in case of a normal HARQ operation in FDD system, if a user equipment detects PDCCH and/or PHICH having a DCI format 0 or 4 in an $n^{th}$ subframe from a serving cell, the user equipment transmits a corresponding PUSCH in an $(n+4)^{th}$ subframe in accordance with PDCCH and PHICH information.

In case of an uplink spatial multiplexing, if a user equipment detects a PHICH transmission in an $n^{th}$ subframe but fails in detecting PDCCH having a DCI format 4, the user equipment retransmits a corresponding PUSCH in an $(n+4)^{th}$ subframe in accordance with a PHICH information. In doing so, if the number of NACK received transport blocks is equal to the number of transport blocks indicated by a latest PDCCH related to the corresponding PUSCH, the corresponding PUSCH is retransmitted using a precoding matrix in accordance with the latest PDCCH and the number of transport layers. On the other hand, if the number of NACK received transport blocks is not equal to the number of transport blocks indicated by a latest PDCCH related to the corresponding PUSCH, the corresponding PUSCH is retransmitted using a precoding matrix in accordance with a codebook index 0 and the number of transport layers equal to the number of layers corresponding to the NACK received transport blocks in the latest PDCCH.

Meanwhile, in case of a subframe bundling operation in FDD system, if a user equipment detects PDCCH having a DCI format 0 in an $n^{th}$ subframe and/or PHICH in an $(n-5)^{th}$ subframe, the user equipment transmits a corresponding 1st PUSCH within a bundle in the $(n+4)^{th}$ subframe in accordance with PDCCH and PHICH information.

Table 5 shows a transmission timing relation of PDCCH and PUSCH corresponding to PDCCH per UL-DL configuration.

TABLE 5

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 6 | 5 | 7 | 8 | 9 |
| 0 | | 4 | 6 | | | 4 | 6 | | | |
| 1 | | | 6 | | 4 | | 6 | | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

Table 6 shows a transmission timing relations of PDCCH and PUSCH corresponding to PDCCH in case of UL-DL configurations 0, 1 and 6.

TABLE 6

| TDD UL/DL Configuration | \multicolumn{10}{c}{subframe number n} | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | | 9 | 6 | | |
| 1 | | | 2 | | | 3 | | 2 | | 3 |
| 6 | | 5 | 5 | | | | 6 | 6 | | 8 |

When UL-DL configurations 1 to 6 are set up in TDD system, in case of a normal HARQ operation, if a user equipment detects PDCCH and/or PHICH having a UL DCI format in an $n^{th}$ subframe, the user equipment transmits a corresponding PUSCH in an $(n+k)^{th}$ subframe in accordance with PDCCH and PHICH information. In this case, a value of k is shown in Table 5.

When UL-DL configuration 0 is set up, in case of a normal HARQ operation, if a user equipment detects PDCCH and/or PHICH having a UL DCI format in an $n^{th}$ subframe, in case that an MSB (most significant bit) of a UL index within the PDCCH having the UL DCI format is set to 1 or PHICH is received in a subframe 'n=0 or 5' within a resource corresponding to '$I_{PHICH}$=0', the user equipment transmits a corresponding PUSCH in an $(n+k)^{th}$ subframe in accordance with PDCCH and PHICH information. In this case, a value of k is shown in Table 5.

On the other hand, when UL-DL configuration 0 is set up, in case of a normal HARQ operation, if an LSB (least significant bit) of a UL index within DCI format 0 or 4 is set to 1 in an $n^{th}$ subframe, PHICH is received in a subframe 'n=0 or 5' within a resource corresponding to '$I_{PHICH}$=1', or PHICH is received in a subframe 'n=1 or 6', the user equipment transmits a corresponding PUSCH in an $(n+7)^{th}$ subframe.

Moreover, when UL-DL configuration 0 is set up, in case of a normal HARQ operation, if both MBS and LSB of a UL index within PDCCH including a UL DCI format is set to 1 in an $n^{th}$ subframe, the user equipment transmits a corresponding PUSCH in both an $(n+k)^{th}$ subframe and an $(n+7)^{th}$ subframe. In this case, a value of k is shown in Table 5.

Meanwhile, when UL-DL configurations 1 to 6 are set up, in case of a subframe bundling operation, if a user equipment detects PDCCH and/or PHICH having a DCI format 0 in an $n^{th}$ subframe and/or PHICH in an $(n-1)^{th}$ subframe, the user equipment transmits a 1st PUSCH within a bundle in an $(n+k)^{th}$ subframe in accordance with PDCCH and PHICH information. In this case, a value of k is shown in Table 5 and a value of 1 is shown in Table 6.

When UL-DL configuration 0 is set up in TDD system, in case of a subframe bundling operation, if a user equipment detects PDCCH having a DCI format 0 in an $n^{th}$ subframe and/or PHICH in an $(n-1)^{th}$ subframe, in case that an MSB (most significant bit) of a UL index within the DCI format is set to 1 or '$I_{PHICH}=0$', the user equipment transmits a corresponding 1$^{st}$ PUSCH within a bundle in an (n+k)$^{th}$ subframe in accordance with PDCCH and PHICH information. In this case, a value of k is shown in Table 5.

Moreover, when UL-DL configuration 0 is set up in TDD system, in case of a subframe bundling operation, if an LSB of a UL index within PDCCH having a DCI format 0 is set to 1 or '$I_{PHICH}=1$', the user equipment transmits a corresponding 1$^{st}$ PUSCH within a bundle in an (n+7)$^{th}$ subframe in accordance with PDCCH and PHICH information.

In the following description, a procedure for a PUCCH transmission in a user equipment is explained.

First of all, an HARQ processing time of FDD system may be different from that of TDD system.

In case of FDD system, if a user equipment detects PDCCH indicating a PDSCH transmission or a DL SPS (semi-persistent scheduling) release in subframe(s) from (n-4)$^{th}$, the user equipment transmits HARQ-ACK/NACK response in an n$^{th}$ UL subframe.

Table 7 shows a DL association set index K ({$k_o, k_1, \ldots k_{M-1}$}).

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of TDD system, if a user equipment detects PDCCH indicating a PDSCH transmission or a DL SPS release in subframe(s) from (n-k)$^{th}$, the user equipment transmits HARQ-ACK/NACK response in an n$^{th}$ UL subframe. In this case, it is k ∈ K And, the K is defined differently depending on a UL-DL configuration like Table 7.

In the following description, a procedure for reporting HARQ-ACK/NACK in a user equipment is explained.

Table 8 shows a downlink (DL) assignment index value.

TABLE 8

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Table 9 shows an uplink association index K in TDD system per UL-DL configuration.

TABLE 9

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |

TABLE 9-continued

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 4 | | | 4 | 4 | | | | | | |
| 5 | | | 4 | | | | | | | |
| 6 | | | 7 | 7 | 5 | | | 7 | 7 | |

In case of UL-DL configurations 1 to 6 in TDD system, a DAI (downlink assignment index) value $V_{DAI}^{UL}$ in DCI format 0 or 4 detected by a user equipment in an (n-k')$^{th}$ subframe indicates the total number of subframes for transmitting PDCCH indicating a DL SPS release and PDSCH to the corresponding user equipment in all subframe(s) from (n-k)$^{th}$. In this case, the $V_{DAI}^{UL}$ is shown in Table 8 and the k' is shown in Table 9. More, the k corresponds to 'k∈K' according to Table 7. The DAI value $V_{DAI}^{UL}$ includes PDSCH having the corresponding PDCCH exist in all subframe(s) from (n-k)$^{th}$ and PDSCH having the corresponding PDCCH not exist in all subframe(s) from (n-k)$^{th}$. If both of the PDSCH and the PDCCH indicating the DL SPS release are not transmitted, the user equipment estimates that the DAI value is set to 4 within the DCI format 0 or the DCI format 4.

In case of UL-DL configurations 1 to 6 in TDD system, the DAI value in DCI format 1/1A/1B/1D/2/2A/2B/2C defines the accumulated number of PDCCH assigning the PDSCH transmission from the (n-k)$^{th}$ subframe to a current frame and PDCCH indicating the DL SPS release. In this case, the k follows k∈K according to Table 7. $V_{DAI}^{DL}$ means a DAI value in the PDCCH having the DCI format 1/1A/1B/1D/2/2A/2B/2C detected by the user equipment in an (n-$k_m$)$^{th}$ subframe according to Table 8. In this case, the $k_m$ means a smallest value in the set K defined in Table 7 and indicates a subframe index from which the user equipment detected the DCI format 1/1A/1B/1D/2/2A/2B/2C.

2. Carrier Aggregation Environment 2. 1. The General of Carrier Aggregation

Communication environments taken into consideration by embodiments of the present invention include all kinds of multicarrier supportive environments. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than a broadcasting in a related SCell.

After an initial security activating process has started, E-UTRAMN may be able to configure a network including at least one SCell in addition to PCell configured in the early stage of a connection establishment process. The PCell provides security and upper layer system information (e.g., mobility information on NAS (non-access-stratum) such as TAI (tracking area identity)). The SCell is used to provide an additional downlink and optional uplink radio resources. E-UTRAN can add, remove or modify the SCell independently by an RRC connection reconfiguration procedure using an RRC connection reconfiguration message (RRCConnectionReconfiguration) including mobility control information (mobilityControlInfo) or an RRC connection reconfiguration message not including the mobility control information.

Cross carrier scheduling is not applied to PCell. In particular, the PCell is always scheduled through PDCCH of the PCell. And, a UL resource allocation (UL grant) and a DL resource allocation (DL assignment) of a cell are always scheduled in the same cell. In particular, a downlink is scheduled on a component carrier #2 and an uplink is scheduled on the component carrier #2 as well. PDCCH order is always transmitted through PCell. And, the PDCCH is applied to a carrier indicator field (CIF) processing like another uplink resource allocation for the PCell. Moreover, MAC (medium access control) activation/deactivation of SCell is maintained. A pathloss reference for UL CC can be configured with DL CC linked by SIB2 (system information block type2) or can be configured with PCell as well. Frame timing, SFN (system frame number) timing and TDD configuration are identically aligned among cells that can be aggregated together.

In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

FIG. 6 is a diagram for one example of a component carrier (CC) of LTE system and carrier aggregation used by LTE-A system.

FIG. 6 (a) shows a single carrier structure used by LTE system. Component carriers include DL CC and UL CC. One component carrier may have a frequency range of 20 MHz.

FIG. 6 (b) shows a carrier aggregation structure used by LTE-A system. Referring to FIG. 6 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, L≤M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type2), a combination of DL and UL resources may be configured. In particular, a linkage may mean a mapping relation between a DL CC for transmitting PDCCH carrying a UL grant and a UL CC using the UL grant or a mapping relationship between a DL/UL CC for carrying HARQ data and a UL/DL CC for carrying HARQ ACK/NACK signal.

2. 2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specific, UE group-specific or cell-specific.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 7:
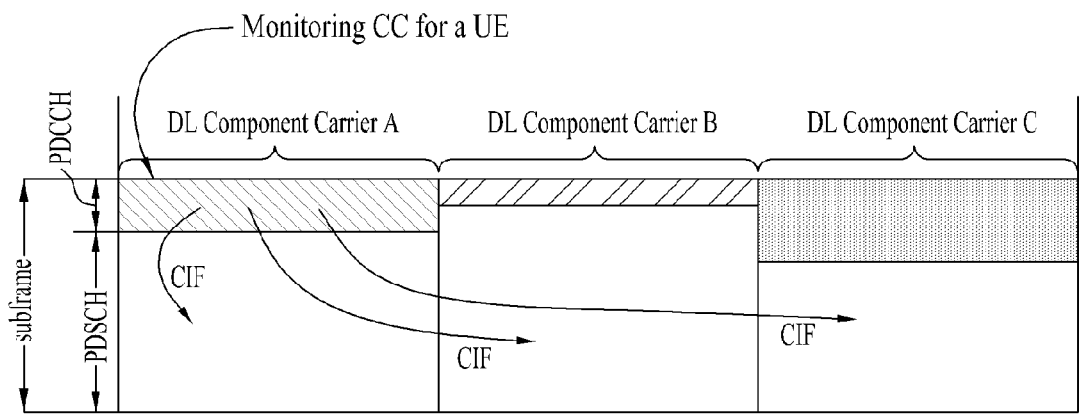
FIG. 7 is a diagram for a subframe structure of LTE-A system in accordance with cross carrier scheduling.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A; is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

A user equipment can transmit channel state information (CSI) (e.g., CQI (channel quality indicator), RI (ranking indication), PMI (precoding matrix indicator, etc.) received/detected or measured from at least one or more CCs or UL control informations such as HARQ ACK/NACK and the like to a base station on one predetermined CC. For instance, when the user equipment transmits responses to data received on DL CC of PCell and data received on DL CC of SCell, i.e., when a multitude of ACK/NACK feedbacks are required, the user equipment gathers a multitude of ACKs/NACKs together (e.g., multiplexing, bundling, etc.) and then transmits them using one PUCCH on UL CC in PCell.

2.3. Intra-Band & Inter-Band

The above-described carrier aggregation environment can be designed as intra-band carrier aggregation (CA) or inter-band carrier aggregation (CA). In this case, a band in intra-band or inter-band means an operating band. And, the operating band means a frequency range for a paired or unpaired operation in E-UTRA.

Table 10 shows an operating band defined by LTE system.

TABLE 10

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note 1:
Band 6 not applicable.

Intra-band carrier aggregation means that a multitude of DL CCs and/or UL CCs located adjacent or close to each other on a frequency. In particular, carrier frequencies of a multitude of DL CCs and/or UL CCs are located within the same operating band. Hence, the design can be achieved on the assumption that a multitude of CCs have similar propagation property through the intra-band carrier aggregation. In this case, the propagation property includes various properties (e.g., propagation/path delay, propagation/path loss, fading channel impact, etc.) affected differently depending on a frequency (or a center frequency).

After a user equipment has matched a UL transmission timing to a cell UL CC, the user equipment uses a UL transmission timing of a secondary cell in the same manner of a UL transmission timing of a primary cell. Yet, a transmission timing of PRACH may differ from this. Through this process, a UL subframe boundary between cells in a user equipment can be matched identically. Therefore, the user equipment can perform a communication in a carrier aggregation environment with a single RF (radio frequency) end.

Yet, due to problems (e.g., remaining frequency assignment, reuse of a frequency previously used for a different purpose, etc.) caused by assigning a frequency to a mobile communication service provider for a mobile communication, at least one cell may not be located close to other cell(s) on a frequency in a carrier aggregation environment. For instance, if there are 2 cells that establish a carrier environment, a carrier frequency of one cell is 800 MHz (UL/DL) and a carrier frequency of the other may be 2.5 GHz (UL/DL). For another instance, a carrier frequency of one cell is 800 MHz (UL/DL) and a carrier frequency of the other may be 2.6 GHz (UL/DL). For further instance, a carrier frequency of one cell is 700 MHz (UL/DL) and a carrier frequency of the other may be 1.7 GHz (UL) and 2.1 GHz (DL). In this case, a carrier frequency may mean a center frequency between DL CCs or between UC CCs. Thus, an environment distant far from a frequency region is called an inter-band carrier aggregation. In particular, it may mean that carrier frequencies of a multitude of DL CCs and/or UL CCs are located on different bands. In this inter-band carrier aggregation environment, it is unable to continue to keep the assumption that the inter-cell subframe (particularly, UL) boundary is identically matched. Hence, different inter-cell UL transmission timings may be required. In this case, a user equipment may use a plurality of RF (radio frequency) ends in order to perform a communication in a carrier aggregation environment.

3. Extension Carrier 3. 1. The General of Extension Carrier

In LTE Release-8/9/10, all user equipments are designed to access and/or use all cells. Yet, a cell or carrier only accessible by and/or available for a user equipment having a new function (e.g., a user equipment having LTE Release-11 function) can be defined in a next release (e.g., Release-11).

For instance, a following carrier type can be defined. And, such a carrier type can be applied to either a DL carrier or a UL carrier or can be applied to both of the DL carrier and the UL carrier. And, such a carrier type can be used in a manner of being replaced by a cell type.

1) Backwards Compatible Carrier

A backwards compatible carrier is a carrier compatible with an existing system and means the carrier accessible by user equipments of all LTE Releases. The backwards compatible carrier may operate as a single carrier (stand-alone) or a portion of carrier aggregation. In FDD system, the backwards compatible carriers exist as a pair (UL & DL) all the time.

2) Non-Backwards Compatible Carrier

A non-backwards compatible carrier is a carrier incompatible with an existing system and means the carrier accessible by user equipments of LTE Release for defining non-backwards compatible carriers without being accessible by user equipments of LTE Release previous to the LTE Release for defining the non-backwards compatible carrier. In case that incompatibility with an existing system is generated due to a duplex distance (i.e., a frequency difference between UL and DL), the non-backwards compatible carrier can operate as a single carrier (stand-alone). In other cases, the non-backwards compatible carrier can operate as a portion of carrier aggregation.

3) Extension Carrier

An extension carrier is unable to operate as a single carrier (stand-alone) and means a carrier that should operate as a portion of a component carrier set including at least one stand-alone-capable carrier. The extension carrier can be called a new type carrier. Such an extension carrier can have the following features.

PBCH, SIB of Release-8 and paging may not be carried.

PDCCH, PHICH and PCFICH may not be carried. In particular, a control region may not exist. Yet, an enhanced PDCCH (e-PDCCH, enhanced-PDCCH) can be carried.

Mobility may be based on measurement within a backwards compatible component carrier.

Figure 8:
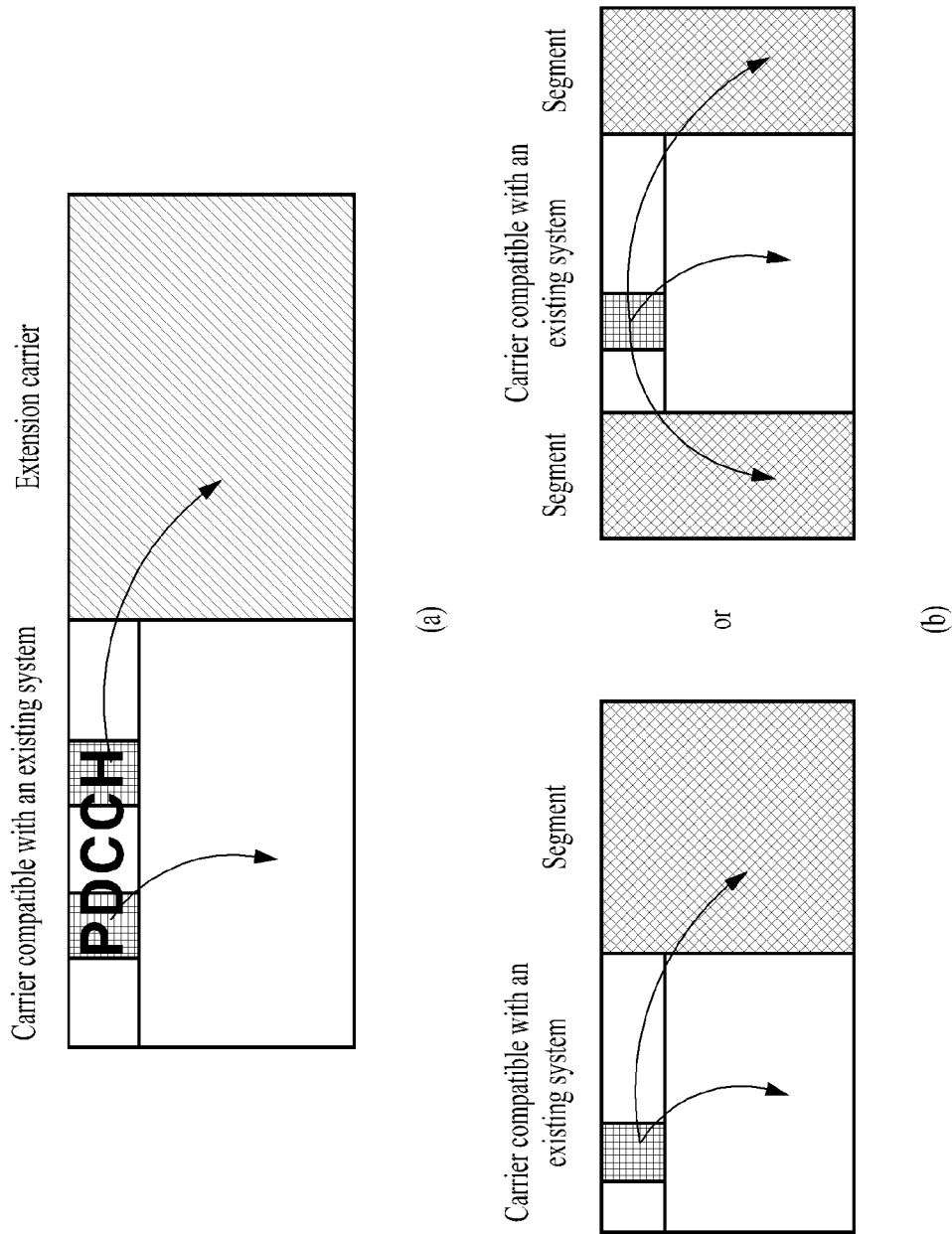
FIG. 8 is a diagram for one example to describe a difference between a segment and an extension carrier.

FIG. 8 is a diagram for one example to describe a difference between a segment and an extension carrier.

FIG. 8 (a) shows one example of an extension carrier. And, FIG. 8 (b) shows one example of a segment.

Referring to FIG. 8 (a), in case of an extension carrier, resource allocation of PDSCH of a backwards compatible carrier and resource allocation of an extension carrier are performed by PDCCHs of the backwards compatible carrier, respectively.

On the other hand, referring to FIG. 8 (b), in case of a segment, resource allocation of PDSCH of a backwards compatible carrier and resource allocation of a segment are simultaneously performed by a single PDCCH of the backwards compatible carrier. Moreover, the segment should be configured with a bandwidth (BW) contiguous with the backwards compatible carrier. And, a maximum bandwidth combined with the backwards compatible carrier is limited to 110 RBs. On the contrary, an extension carrier can be managed without such a condition of limit.

The above-described extension carrier can be used for the purpose of increasing frequency efficiency (or spectral efficiency) or for the purpose of interference mitigation. Since resource allocation of an extension carrier is scheduled by PDCCH of a backwards compatible carrier, a control signal of L1/L2 (layer 1/layer 2) is not transmitted. Hence since there is no control region (PDCCH, PHICH, PCFICH), PDSCH can be transmitted from an OFDM $1^{st}$ symbol. Particularly, in case that the number of user equipments is small, it is able to enhance frequency efficiency (or spectral efficiency) by reducing overhead in a manner of using the control region more efficiently.

Unlike the former description, for clarity of the following description of the present invention, carriers other than 'carrier accessible by user equipments of all LTE Releases (i.e., backwards compatible carrier)' can be generally named extension carriers.

Meanwhile, a wireless communication system of a cellular network has interference between homogeneous base stations (homogeneous network) or between heterogeneous base stations (heterogeneous network). As examples of the heterogeneous base stations, there are a macro cell having a great service radius and a pico cell having a relatively service radius. Such interference can affect a control channel as well as a data channel. In LTE/LTE-A system, an interference-receiving cell (i.e., a victim cell) is enabled to receive an interference-free signal in a manner that ABS (almost blank subframe) is allocated for the purpose of interference mitigation of a data channel (PDSCH), or a frequency region allocated to each user equipment on a cell edge can be allocated orthogonally using scheduling information between base stations. In this case, the ABS means a subframe in which a data signal is not transmitted. Yet, even if a subframe is allocated with ABS, since a control signal is transmitted in the subframe on a control channel (e.g., PDCCH, PCFICH, PHICH, etc.), it is difficult to mitigate interference on a control channel of an adjacent cell. Therefore, by configuring an extension carrier, which does not carry a control signal, with ABS, it is able to mitigate interference on an adjacent cell.

Figure 9:
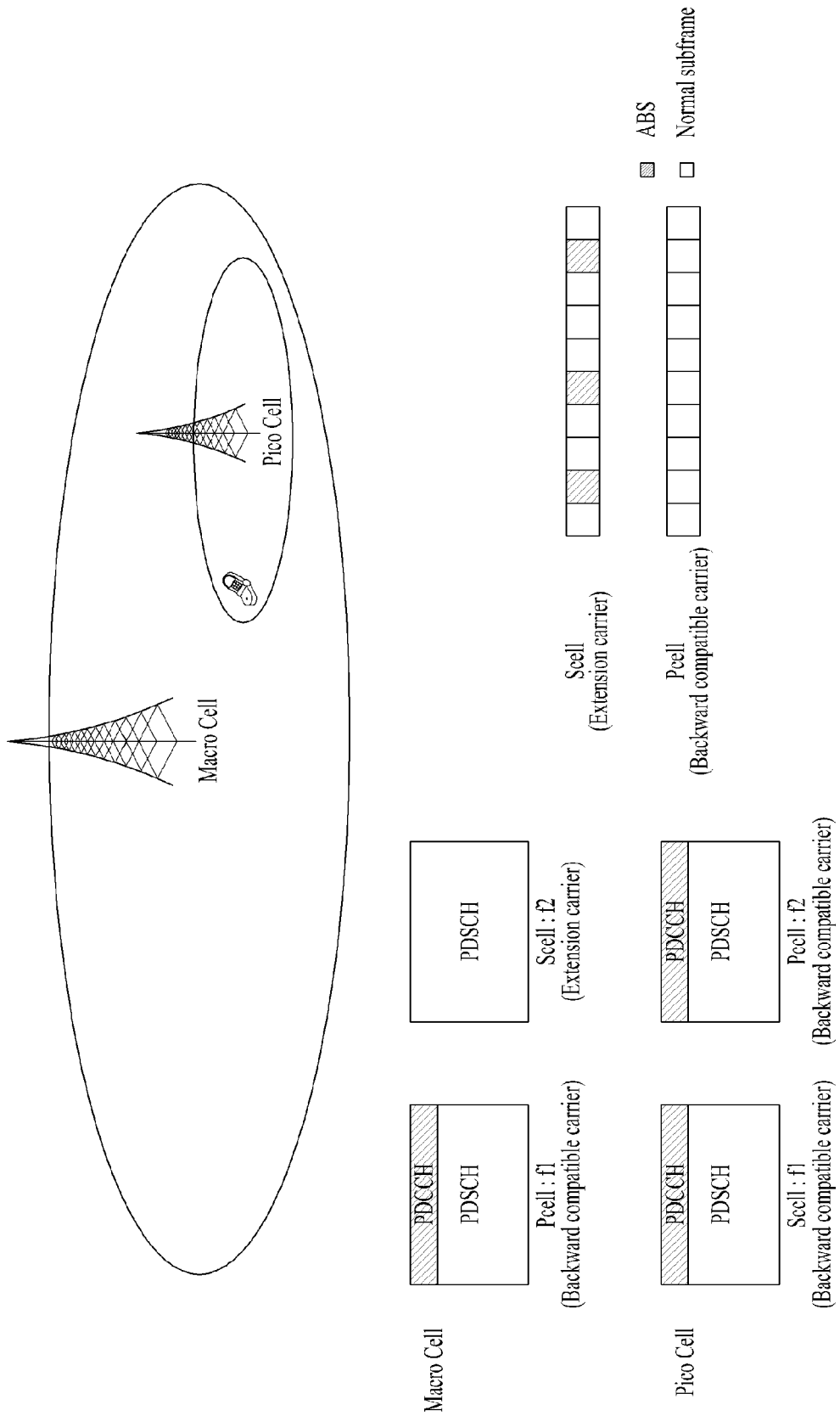
FIG. 9 is a diagram for one example of mitigating interference by configuring an extension carrier with ABS (almost blank subframe) in a heterogeneous base station environment.

FIG. 9 is a diagram for one example of mitigating interference by configuring an extension carrier with ABS (almost blank subframe) in a heterogeneous base station environment.

Referring to FIG. 9, in a heterogeneous base station environment having a macro cell and a pico cell, the macro cell can be set to use a backwards compatible carrier ($1^{st}$ frequency) and an extension carrier ($2^{nd}$ frequency) as a PCell and an SCell, respectively. The pico cell can be set to use a backwards compatible carrier ($2^{nd}$ frequency) and a backwards compatible carrier ($1^{st}$ frequency) as a PCell and an SCell, respectively. In this case, the SCell (i.e., extension carrier, $2^{nd}$ frequency) of the macro cell is configured with ABS, whereby interference on a control channel and a data channel of the PCell (i.e., backwards compatible carrier, $2^{nd}$ frequency) of the pico cell can be mitigated. As mentioned in the foregoing description, although it is unable to mitigate interference of a control channel by allocating ABS, it is able to mitigate the interference of the control channel using an extension carrier that does not carry a control signal.

In this case, although it is able to mitigate the interference of a data channel and a control channel by allocating ABS to an extension carrier, the ABS allocation causes a problem that a data throughput is decreased. In the following description, a method of increasing a data throughput of an extension carrier is explained.

3. 2. Data Transceiving Method Using Extension Carrier

In case of not using an extension carrier according to a related art (e.g., LTE-A Release-8, LTE-A Release-9, LTE-A Release-10, etc.), when data is transmitted on PDSCH, a starting point of transmitting data in a subframe can be determined as an index corresponding to one of 1 to 4. In particular, as an index of a data stating point (PDSCH-starting point) was not able to become 0, at least one OFDM symbol is set as a control region in a downlink frame structure of the related art. Yet, since a control channel region does not exist in an extension carrier, an index of a data starting point can be set to 0 unlike the related art. In particular, according to the present invention, it is able to increase a data throughput by controlling data to be transmitted in a subframe of an extension carrier by starting with a $1^{st}$ OFDM symbol of the subframe.

Figure 10:
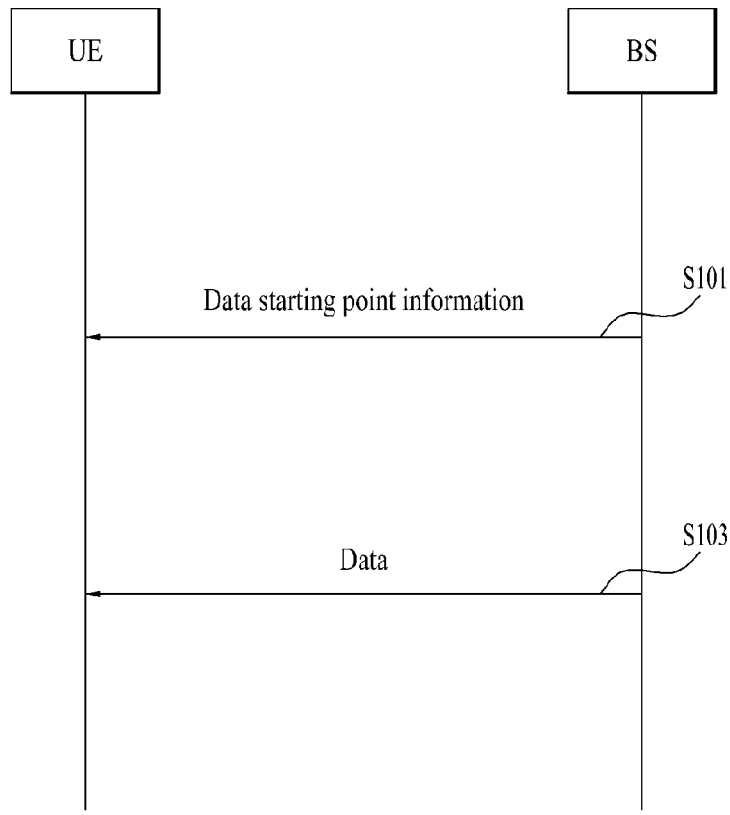
FIG. 10 is a flowchart for one example of a data receiving method according to one embodiment of the present invention.

FIG. 10 is a flowchart for one example of a data receiving method according to one embodiment of the present invention.

Referring to FIG. 10, first of all, when a user equipment receives data through an extension carrier from a base station, the user equipment receives information on a data starting point that indicates a symbol at which a transmission of the data starts in a subframe [S101]. In this case, the symbol in which the transmission of the data starts is determined as one of a plurality of symbols including a $1^{st}$ symbol. For instance, a data starting point can be determined as an index corresponding to one of 1 to 4.

Secondly, having received the data starting point information, the user equipment receives the data through an extension carrier based on the data starting point information [S103]. When the user equipment receives the data through the extension carrier based on the data starting point information, since the user equipment can receive the data by starting with the $1^{st}$ symbol of the subframe, a data throughput can be increased.

A method of indicating a data starting point of an extension carrier may vary depending on a presence or non-presence of a cross carrier scheduling. If the cross carrier scheduling is configured, it is able to indicate a data starting point through RRC signaling for performing the cross carrier scheduling on SCell, which is described in detail with reference to the following chapter '3. 2. 1.'. On the contrary, if the cross carrier scheduling is not configured, a data starting point of an extension carrier can be indicated by newly defining a field for indicating a data starting point of an extension carrier in a radio resource configuration of an RRC signaling field, or using a newly defined RRC signaling field other than the radio resource configuration. This is described with reference to the following chapter '3. 2. 2.'.

3. 2. 1. Case of Using Cross Carrier Scheduling

In a carrier aggregation system using an extension carrier, if a cross scheduling is activated, it is able to schedule the extension carrier using PDCCH of a backwards compatible carrier. In this case, a user equipment is able to indicate a data starting point of the extension carrier by RRC signaling. The data starting point means a position (or index) of an OFDM symbol in a subframe. The index of the OFDM symbol in the subframe corresponds to one of 0 to 13 in case of a normal CP or one of 0 to 11 in case of an extended CP.

And, in case of not using an extension carrier according to a related art (e.g., LTE-A Release-8, LTE-A Release-9, LTE-A Release-10, etc.), a data starting point can be determined as an index corresponding to one of 1 to 4. The reason for determining the index of the data starting point as a value starting not with 0 but with 1 is that at least one OFDM symbol is set as a control region in a downlink frame structure. Yet, in case of an extension carrier, since a control channel region does not exist, an index of a data starting point can be set to 0 unlike the related art. In particular, according to the present invention, it is able to increase a data throughput in a manner that a $1^{st}$ OFDM symbol of a subframe in an extension carrier is set to carry data. In this case, a data starting point can be determined as follows.

1) If a downlink bandwidth of an extension carrier is equal to or smaller than 10 resource blocks, a data starting point can be set to one of 0, 2, 3 and 4. On the contrary, if a downlink bandwidth of an extension carrier is greater than 10 resource blocks, a data starting point can be set to one of 0, 1, 2 and 3.

2) If a downlink bandwidth of an adjacent cell configuring a carrier aggregation with an extension carrier is equal to or smaller than 10 resource blocks, a data starting point can be set to one of 0, 2, 3 and 4. On the contrary, if a downlink bandwidth of an adjacent cell configuring a carrier aggregation with an extension carrier is greater than 10 resource blocks, a data starting point can be set to one of 0, 1, 2 and 3.

3) A data starting point can be set to one of 0 to 4 irrespective of a downlink bandwidth of an extension carrier or an adjacent cell. In this case, ASN (abstract syntax notation code) of an RRC signal can be represented as Table 12 in the following.

TABLE 12

```
-- ASN1START
CrossCarrierSchedulingConfig for extension carrier ::= SEQUENCE {
    schedulingCellInfo   CHOICE {
        own              SEQUENCE { -- No cross carrier scheduling
            cif-Presence         BOOLEAN
        },
        other            SEQUENCE { -- Cross carrier scheduling
            schedulingCellId     ServCellIndex,
            pdsch-Start          INTEGER (0..4)
        }
    }
}
-- ASN1STOP
```

In Table 12, "pdsch-Start INTEGER (0 . . . 4)" indicates that a data starting point is determined as an index corresponding to one of 0 to 4. As mentioned in the foregoing description, in case of not using an extension carrier according to the related art, a data starting point is determined as an index corresponding to one of 1 to 4. Yet, according to the present invention, data can be transmitted in a subframe by starting with a $1^{st}$ symbol (i.e., index 0) of the subframe, whereby a data throughput can be increased.

3. 2. 2. Case of Using Self-Scheduling

In a carrier aggregation system using an extension carrier, it is able to perform a self-scheduling using ePDCCH (enhanced PDCCH) transmitted through PDSCH of an extension carrier without using a cross scheduling (i.e., not performing a scheduling using PDCCH of a backwards compatible carrier). In this case, the extension carrier is able to indicate a data starting point by an independent RRC signaling. For instance, it is able to indicate the data starting point by adding a field for indicating the data starting point of the extension carrier to a radio resource configuration in a field used for the RRC signaling, or adding a new RRC signaling field other than the radio resource configuration. In this case, the data starting point can be determined as follows.

1) If a downlink bandwidth of an extension carrier is equal to or smaller than 10 resource blocks, a data starting point can be set to one of 0, 2, 3 and 4. On the contrary, if a downlink bandwidth of an extension carrier is greater than 10 resource blocks, a data starting point can be set to one of 0, 1, 2 and 3.

2) If a downlink bandwidth of an adjacent cell configuring a carrier aggregation with an extension carrier is equal to or smaller than 10 resource blocks, a data starting point can be set to one of 0, 2, 3 and 4. On the contrary, if a downlink bandwidth of an adjacent cell configuring a carrier aggregation with an extension carrier is greater than 10 resource blocks, a data starting point can be set to one of 0, 1, 2 and 3.

3) A data starting point can be set to one of 0 to 4 irrespective of a downlink bandwidth of an extension carrier or an adjacent cell. In this case, ASN (abstract syntax notation code) of an RRC signal can be represented as Table 13 in the following.

TABLE 13

```
-- ASN1START
extension carrier data starting point::= SEQUENCE {
    pdsch-Start                  INTEGER (0..4)
}
-- ASN1STOP
```

In Table 13, "pdsch-Start INTEGER (0 . . . 4)" indicates that a data starting point is determined as an index corresponding to one of 0 to 4. As mentioned in the foregoing description, in case of not using an extension carrier according to the related art, a data starting point is determined as an index corresponding to one of 1 to 4. Yet, according to the present invention, data can be transmitted in a subframe by starting with a $1^{st}$ symbol (i.e., index 0) of the subframe, whereby a data throughput can be increased. Moreover, if an extension carrier performs a self-scheduling using ePDCCH, the ePDCCH starts to be transmitted from a data starting point.

4. The General of Device for Implementing the Present Invention

Figure 11:
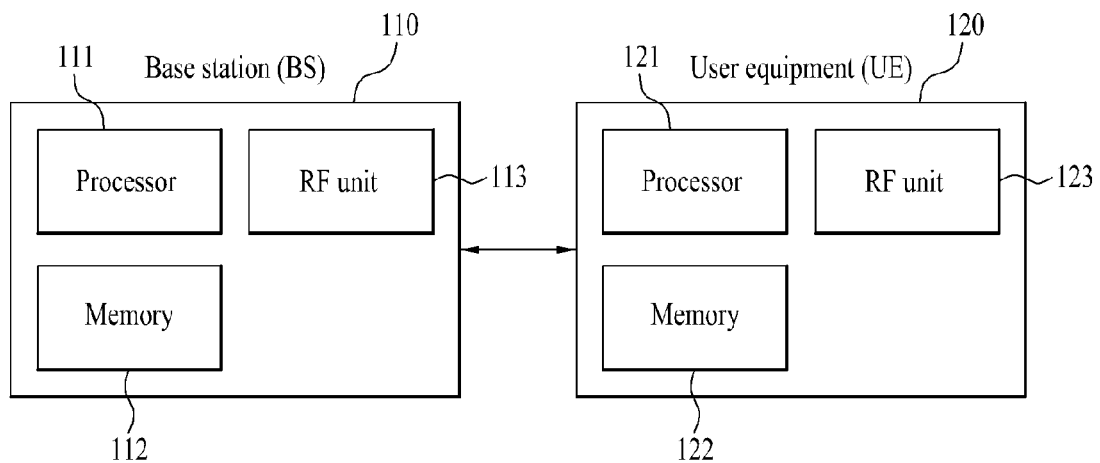
FIG. 11 is a block diagram for one example of a configuration of a wireless communication device according to one embodiment of the present invention.

FIG. 11 is a block diagram for a configuration of a wireless communication device according to one embodiment of the present invention.

Referring to FIG. 11, a wireless communication system may include a base station BS 110 and a plurality of User equipments 120 located within an area of the base station 110.

The base station 110 may include a processor 111, a memory 112 and an RF (radio frequency) unit 113. The processor 111 implements the proposed functions, processes and/or methods. Layers of a radio interface protocol can be implemented by the processor 111. The memory 112 is connected with the processor 111 and then stores various kinds of information to drive the processor 111. The RF unit 113 is connected with the processor 111 and then transmits and/or receives radio signals.

The user equipment 120 includes a processor 121, a memory 122 and an RF unit 123. The processor 121 implements the proposed functions, processes and/or methods. Layers of a radio interface protocol can be implemented by the processor 121. The memory 122 is connected with the processor 121 and then stores various kinds of information to drive the processor 121. The RF unit 123 is connected with the processor 121 and then transmits and/or receives radio signals.

The memory 112/122 may be provided within or outside the processor 111/121. And, the memory 112/122 may be connected with the processor 111/121 via various kinds of well-known means. Moreover, the base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method proposed by the present invention is described with reference to examples applying to 3GPP LTE system, it may be applicable to various kinds of wireless access systems as well as the 3GPP LTE system.

What is claimed is:

1. A method of receiving data in a wireless access system supportive of carrier aggregation, the method performed by a user equipment and comprising:
    receiving a data starting point information indicating a symbol for starting a transmission of the data in a subframe when the data is transmitted on a secondary carrier configuring the carrier aggregation with a primary carrier; and
    receiving the data on the secondary carrier based on the data starting point information,
    wherein the symbol for starting the transmission of the data is determined as one of a plurality of symbols including a 1st symbol of the subframe,
    wherein the secondary carrier carries the data together with a stand-alone carrier and includes an extension carrier to which a resource is allocated by the stand-alone carrier,
    wherein if a downlink bandwidth of the extension carrier is equal to or smaller than 10 resource blocks, the data starting point is determined as one selected from the group consisting of the 1st, the 3rd, the 4th and the 5th symbols of the subframe, and
    wherein if the downlink bandwidth of the extension carrier is greater the 10 resource blocks, the data starting point is determined as one selected from the group consisting of the 1st to 4th symbols of the subframe.

2. The method of claim 1, wherein the extension carrier does not include a control region for carrying a control signal.

3. The method of claim 1, wherein the extension carrier includes an ABS (almost blank subframe) in which the data is not transmitted.

4. The method of claim 1,
    wherein if the downlink bandwidth of the adjacent cell having the same center frequency of the extension carrier is greater the 10 resource blocks, the data starting point is determined as one selected from the group consisting of the 1st to 4th symbols of the subframe.

5. A method of transmitting data in a wireless access system supportive of carrier aggregation, the method performed by a base station and comprising:
    transmitting a data starting point information indicating a symbol for starting a transmission of the data in a subframe when the data is transmitted on a secondary carrier configuring the carrier aggregation with a primary carrier; and
    transmitting the data on the secondary carrier based on the data starting point information,
    wherein the symbol for starting the transmission of the data is determined as one of a plurality of symbols including a 1st symbol of the subframe,
    wherein the secondary carrier carries the data together with a stand-alone carrier and includes an extension carrier to which a resource is allocated by the stand-alone carrier,
    wherein if a downlink bandwidth of the extension carrier is equal to or smaller than 10 resource blocks, the data starting point is determined as one selected from the group consisting of the 1st, the 3rd, the 4th and the 5th symbols of the subframe, and wherein if the downlink bandwidth of the extension carrier is greater the 10 resource blocks, the data starting point is determined as one selected from the group consisting of the 1st to 4th symbols of the subframe.

6. The method of claim 5, wherein the extension carrier does not include a control region for carrying a control signal.

7. The method of claim 5, wherein the extension carrier includes an ABS (almost blank subframe) in which the data is not transmitted.

8. A user equipment for receiving data in a wireless access system supportive of carrier aggregation, the user equipment comprising:

an RF (radio frequency) unit configured to transceive radio signals; and a processor which is configured to:

receive a data starting point information indicating a symbol for starting a transmission of the data in a subframe when the data is transmitted on a secondary carrier configuring the carrier aggregation with a primary carrier;

receive the data on the secondary carrier based on the data starting point information, wherein the symbol for starting the transmission of the data is determined as one of a plurality of symbols including a 1st symbol of the subframe, wherein the secondary carrier carries the data together with a stand-alone carrier and includes an extension carrier to which a resource is allocated by the stand-alone carrier, wherein if a downlink bandwidth of the extension carrier is equal to or smaller than 10 resource blocks, the data starting point is determined as one selected from the group consisting of the 1st, the 3rd, the 4th and the 5th symbols of the subframe, and wherein if the downlink bandwidth of the extension carrier is greater the 10 resource blocks, the data starting point is determined as one selected from the group consisting of the 1st to 4th symbols of the subframe.

9. A base station for transmitting data in a wireless access system supportive of carrier aggregation, the base station comprising:

an RF (radio frequency) unit configured to transceive radio signals; and a processor which is configured to:

transmit a data starting point information indicating a symbol for starting a transmission of the data in a subframe when the data is transmitted on a secondary carrier configuring the carrier aggregation with a primary carrier;

transmit the data on the secondary carrier based on the data starting point information, wherein the symbol for starting the transmission of the data is determined as one of a plurality of symbols including a 1st symbol of the subframe, wherein the secondary carrier carries the data together with a stand-alone carrier and includes an extension carrier to which a resource is allocated by the stand-alone carrier, wherein if a downlink bandwidth of the extension carrier is equal to or smaller than 10 resource blocks, the data starting point is determined as one selected from the group consisting of the 1st, the 3rd, the 4h and the 5th symbols of the subframe, and wherein if the downlink bandwidth of the extension carrier is greater the 10 resource blocks, the data starting point is determined as one selected from the group consisting of the 1st to 4th symbols of the subframe.

* * * * *